United States Patent [19]

Trammell, Jr.

[11] 4,029,334

[45] June 14, 1977

[54] BICYCLE DRIVE ASSEMBLY

[75] Inventor: Earl M. Trammell, Jr., St. Louis, Mo.

[73] Assignee: Cycle-Drive Corporation, St. Louis, Mo.

[22] Filed: Sept. 17, 1975

[21] Appl. No.: 614,265

Related U.S. Application Data

[63] Continuation-in-part of Ser. Nos. 417,060, Nov. 19, 1973, Pat. No. 3,906,807, and Ser. No. 229,898, Feb. 28, 1972, Pat. No. 3,779,099.

[52] U.S. Cl. .................................. 280/261; 74/36; 74/68; 74/569; 280/257
[51] Int. Cl.² ......................................... B62M 1/02
[58] Field of Search .......... 280/261, 260, 259, 257; 74/68, 69, 66, 63, 36, 142, 567, 569

[56] References Cited

UNITED STATES PATENTS

| 619,498 | 2/1899 | Pedersen | 74/66 X |
|---|---|---|---|
| 3,375,022 | 3/1968 | Hatian | 280/261 X |
| 3,418,858 | 12/1968 | Minnich | 74/68 |

FOREIGN PATENTS OR APPLICATIONS

| 719,372 | 2/1932 | France | 280/261 |
|---|---|---|---|
| 494,462 | 10/1938 | United Kingdom | 280/261 |
| 463,924 | 4/1937 | United Kingdom | 280/261 |

Primary Examiner—Joseph F. Peters, Jr.
Assistant Examiner—John P. Silverstrim
Attorney, Agent, or Firm—Cohn, Powell & Hind

[57] ABSTRACT

A drive assembly for a physically propelled vehicle such as a bicycle having a crank arm operatively connected to a drive member for rotating the drive member, and a power arm rotatively mounted for relative angular movement between the power arm and crank arm. A control mechanism interconnects the power arm and the crank arm for rotating the crank arm and drive member, and for accelerating the power arm ahead of the crank arm during one portion of the crank arm cycle and decelerating the power arm behind the crank arm during another portion of the crank arm cycle. More particularly, the control mechanism includes a cam surface provided on either the crank arm or power arm, and a cam element having a shaft rotatively mounted on the other of the arms and having a spaced cam follower engaging the cam surface. The pedal mechanism is operatively connected to the cam element to cause relative rotation of the cam element and the arm to which the cam shaft is rotatively mounted to regulate movement of the cam follower on the cam surface during rotation of the crank arm and power arm.

13 Claims, 11 Drawing Figures

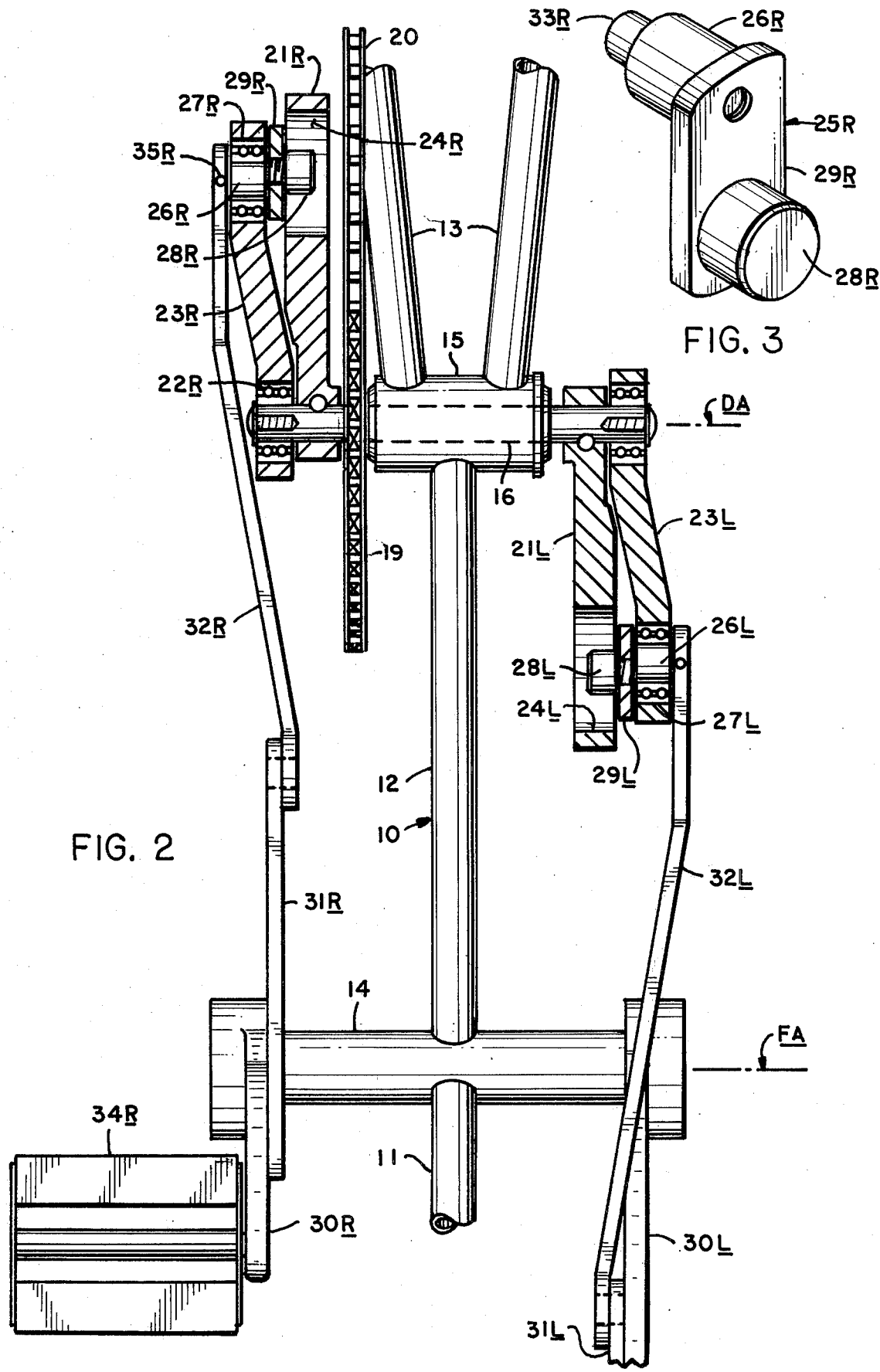

BICYCLE DRIVE ASSEMBLY

CROSS-REFERENCE TO RELATED APPLICATIONS

This application is a continuation-in-part of application Ser. No. 417,060, filed Nov. 19, 1973 and entitled "Bicycle Drive Assembly" and issued Sept. 23, 1975 as U.S. Pat. No. 3,906,807, and application Ser. No. 229,898, filed Feb. 28, 1972, now U.S. Pat. No. 3,779,099 issued Dec. 18, 1973 which was co-pending with U.S. Pat. No. 3,906,807.

BACKGROUND OF THE INVENTION

This invention relates generally to improvements in a drive assembly for a physically propelled vehicle, and more particularly to an improved bicycle drive assembly.

A heretofore conventional bicycle drive assembly includes a crankshaft having a pedal which is connected to a sprocket, the pedal and crankshaft being turned directly with a rotary motion imparted by the rider. Propelling a bicycle with this conventional drive assembly has certain uncomfortable and inefficient aspects in that the rider must stand up on the pedals and assume a jack-knife position in order to obtain anything approaching effective pedaling power. This new drive assembly smoothly and efficiently controls the rate of pedal force. It further permits all pedaling to be done from a comfortable sitting position and maximum pedal force to be easily and readily applied while seated. It is no longer necessary to stand up on the pedals in order to get sufficient pedaling power.

There have been some various types of drives developed for driving a bicycle with substantially reciprocating or oscillating pedaling action, but these prior drive assemblies have met with no success because they too are inefficient in their transfer of pedaling power through well known linkage mechanisms.

SUMMARY OF THE INVENTION

The present drive assembly includes a more positive and efficient control over the pedal action, which in turn permits a more efficient rate of pedal travel to be established during the pedal power portion of the crank arm cycle.

The drive assembly performs smoothly and automatically under all phases of pedaling and requires no skill by the rider in order to obtain the improved performance. It provides for the same continuous, efficient rate of pedal travel for every crank arm cycle.

The drive assembly provides control over the rate of pedal travel in self-propelled devices, and permits the rate of pedal travel to be calculated and adjusted to more efficiently respond to the pedal forces. Dimensional changes in the adjusting and arriving at the most efficient rate of pedal travel or speed. Specifically, during dead top center and early degrees of crank arm travel, when conventional crank systems exert little turning effort to the crank arm, the present drive assembly provides effective torque for doing so and further serves to establish an efficient rate of pedal speed throughout the pedal cycle.

The present drive assembly can be utilized to establish the same advantages for rotary pedal action as it does for reciprocating or oscillating pedal action. This is basically accomplished by transferring the foot pedal to the pivot point of the power crank arm and the connector, which causes the pedal to travel in a rotary cycle. It can be seen that the rate of rotary pedal action achieves the same advantages during top dead center and early degrees of crank arm travel as does the reciprocating or oscillating pedal. In fact, the rotary pedal rate of travel for the 360° crank arm cycle is relatively the same as accomplished by the reciprocating or oscillating pedal travel.

In the present drive assembly, a crank arm is operatively connected to a rotatively mounted drive member for rotating the drive member, and a power arm is rotatively mounted for relative angular movement between the power arm and the crank arm. A pedal means is operatively connected to the power arm for rotating the power arm. A control means interconnects the power arm and crank arm for rotating the crank arm and the drive member, and for accelerating the power arm ahead of the crank arm during one portion of the crank arm cycle and decelerating the power arm behind the crank arm during another portion of the crank arm cycle.

The control means includes a cam surface provided on either the power arm or crank arm, and a cam element having a shaft rotatively mounted on the other of such arms, the cam element being provided with a spaced cam follower engaging the cam surface.

The pedal means is operatively connected to the cam element to cause relative rotation of the cam element and the arm to which the cam shaft is rotatively mounted to regulate movement of the cam follower on the cam surface during rotation of the crank arm and power arm for selectively moving the power arm ahead of and behind the crank arm.

In one embodiment of the drive assembly, the cam surface is provided on the crank arm, and the cam shaft is rotatively mounted in the power arm. The pedal means includes a substantially reciprocating connector pivotally mounted to the power arm for rotating the power arm, the connector being attached to the cam shaft of the cam element to cause relative rotation of the cam element and the power arm during rotation of the crank arm and power arm for selectively moving the power arm ahead of and behind the crank arm as previously described.

It will be understood that the angular position of the cam element between the crank arm and the power arm determines the position during the crank arm cycle at which the maximum angular distance occurs between the crank arm and the power arm. This position can be selectively determined in one embodiment by adjustably attaching the cam shaft of the cam element to the connector to vary the relative angular relation of the cam element between the crank arm and power arm.

In another embodiment of the drive assembly, the pedal means includes a first gear mounted on the drive axis, and a second gear meshing with and rotatable about the first gear, and connected to the cam shaft to cause relative rotation of the cam element and the crank arm during rotation of the crank arm and power arm for selectively moving the power arm ahead of and behind the crank arm. In this embodiment, the first gear can be adjustably mounted to vary the relative angular relation of the cam element between the crank arm and power arm so as to select the position during the crank arm cycle at which the maximum angular distance occurs between the crank arm and power arm.

BRIEF DESCRIPTION OF THE DRAWINGS

FIG. 2 is a top plan view of the assembly shown in FIG. 1;

FIG. 3 is an enlarged perspective view of the cam element;

DESCRIPTION OF THE PREFERRED EMBODIMENTS

Figure 1:
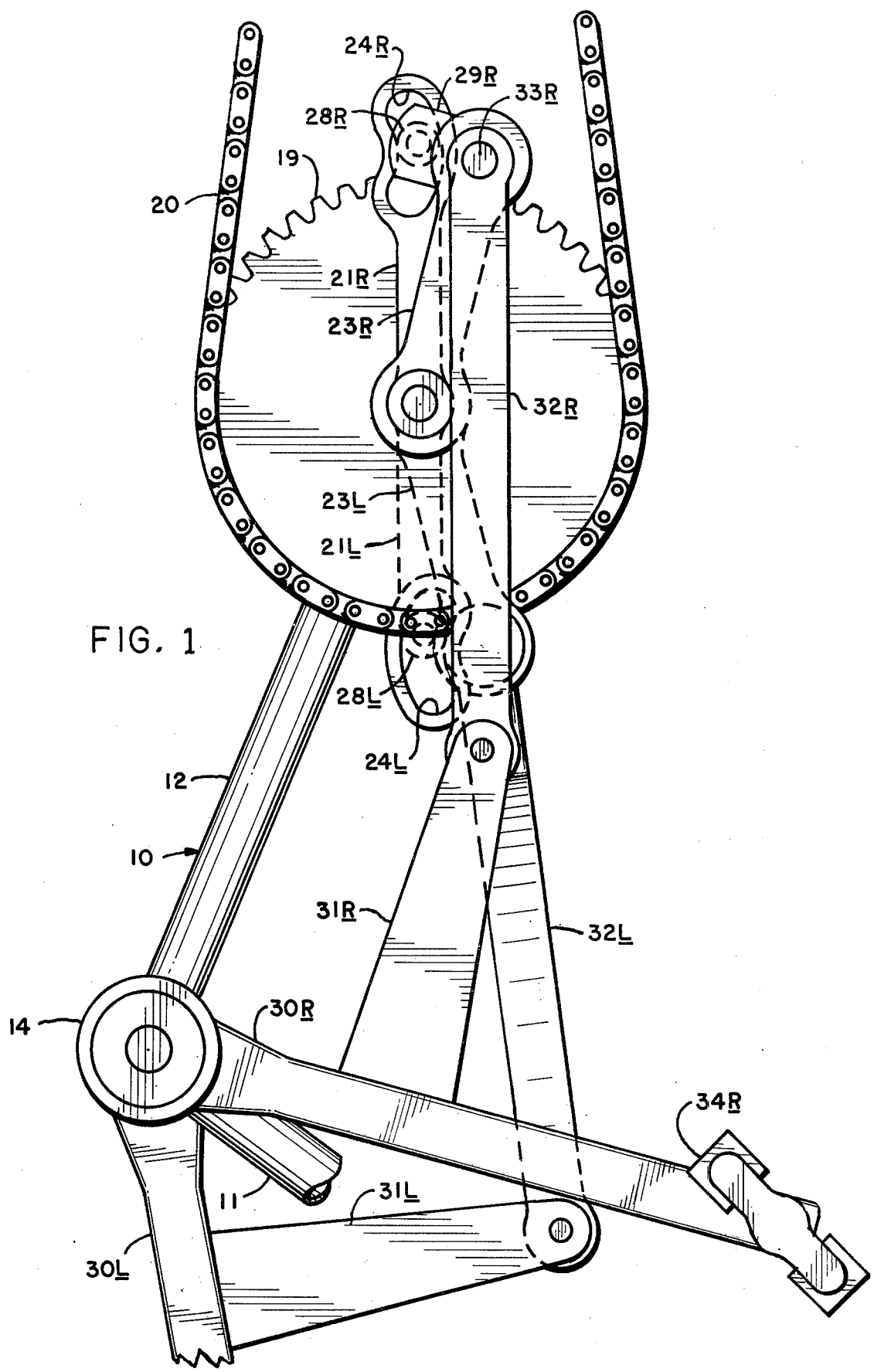
FIG. 1 is a fragmentary, side elevational view of a bicycle incorporating the improved drive assembly.

Referring now by characters of reference to the drawings, and first to FIG. 1, it is seen that the bicycle includes a frame generally indicated by 10 having frame portions 11, 12 and 13 interconnected by bearing journals 14 and 15. Otherwise, the frame 10 can be substantially conventional such as that disclosed in the co-pending U.S. Pat. No. 3,906,807 and its co-pending U.S. Pat. No. 3,779,099, previously mentioned.

As is best shown in FIG. 2, a crank-shaft 16 is rotatively mounted within the bearing journal 15, the crank-shaft 16 defining a drive axis DA. A sprocket 19, constituting a drive member, is attached to and rotatable with the crank-shaft 16, and is located on the right hand side of the frame 10. As is conventional, the sprocket 19 is connected to the drive wheel (not shown) of the bicycle by an endless chain 20.

It will be understood that the mechanism of the drive assembly actuated by the rider's right foot is the same as the mechanism provided for the rider's left foot except that the component parts are appropriately arranged so that when the rider's one foot is substantially in its uppermost position, the other foot is substantially in or near its lowermost position. Consequently, a detailed description of the mechanism for the rider's right foot will suffice for the mechanism for the left foot, and the corresponding component parts will be given identical reference numbers except that the mechanism for the rider's right foot will bear the suffix R and the mechanism for the rider's left foot will bear the suffix L.

The crank-shaft 16 includes a crank arm 21R that rotates on the same drive axis DA as the sprocket 19. Rotatively mounted by bearing 22R on the crank shaft 16, laterally outward of the crank arm 21R, is a power arm 23R.

A control means interconnects the crank arm 21R and power arm 23R for rotating the crank arm 21R and the sprocket 19, and for accelerating the power arm 23R ahead of the crank arm 21R during one portion of the crank arm cycle and decelerating the power arm 23R behind the crank arm during another portion of the crank arm cycle. This control means includes a cam surface 24R formed by a slot provided on the crank arm 21R. The control means further includes a cam element generally indicated by 25R in FIG. 3, having a shaft 26R rotatively mounted in a bearing 27R in the power arm 23R and having a spaced cam follower 28R engageable with the cam surface 24R, the spaced cam shaft 26R and cam follower 28R being interconnected by a link 29R.

A pedal means includes an arm 30R rotatively mounted in one end of the bearing journal 14. The bearing journal 14 defines a fixed axis FA. A pedal arm extension 31R is pivotally connected to one end of a substantially reciprocatively movable connector 32R. The other end of the connector 32R is fixed to the reduced end 33R of the cam shaft 26R, and thereby is pivotally mounted by the cam shaft 26R to the power arm 23R.

Carried on the outer end of the pedal arm 30R is a pedal 34R adapted to receive the rider's right foot for actuating the arm 30R.

Figure 4:
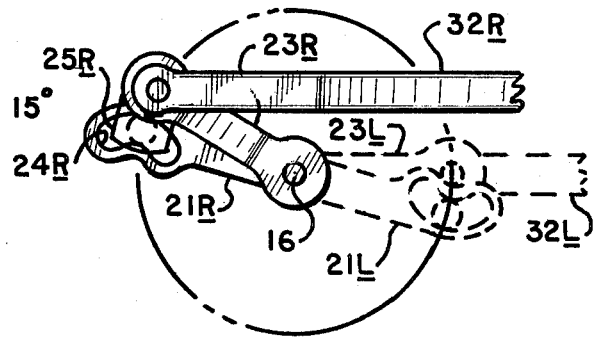
FIGS. 4–7 are diagrams illustrating the positions of the component parts of the drive assembly at various stages of the crank arm cycle.

The operation of the drive assembly is perhaps best shown by the diagrammatic illustrations of FIGS. 4–7. The first diagram of FIG. 4 shows the arrangement of the component parts of the drive assembly when the crank arm 21R is 15° past dead top center position. In this position, the power arm is located approximately 30° past dead top center which is the maximum angular distance between the crank arm 21R and the power arm 23R, as determined by the angular position of the cam element 25R between such arms 21R and 23R. It will be understood that the crank arms 21R and 21L are maintained at opposed 180° relationship at all times. In FIG. 4, the power arm 23L is located behind its associated crank arm 21L the maximum angular distance of 15°.

Figure 5:
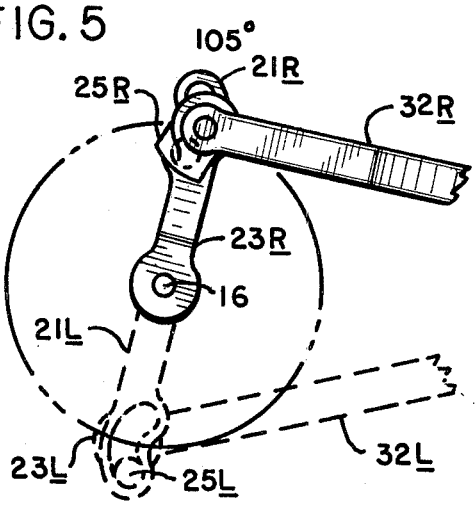

As the pedal arm 30R is moved from its substantially upright position downwardly by the rider, the connector 32R rotates the power arm 23R from the position shown in FIG. 4 to the position shown in FIG. 5, i.e., to approximately 105° past dead top center. As this action takes place, the cam element 25R rotates relative to the power arm 23R, and simultaneously rotates the crank arm 21R. During this power arm 23R and crank arm 21R rotation, the cam follower 28R engages the cam surface 24R to effectively decelerate the relative movement of the power arm 23R, and brings the power arm 23R and crank arm 21R into substantial alignment at the 105° position illustrated in FIG. 5.

It will also be understood that the other power arm 23L and its associated crank arm 21L are brought into substantial alignment at substantially 180° opposed to the 105° position attained by the power arm 23R and crank arm 21R.

Figure 6:
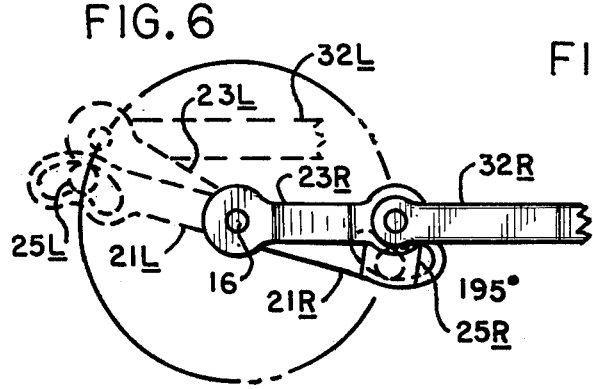
Figure 7:
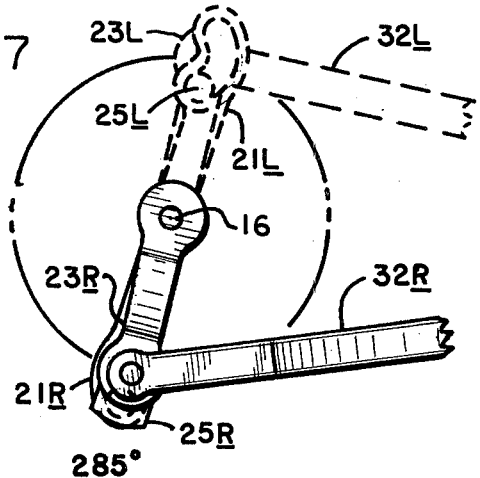

Upon continued downward movement of the pedal arm 30R, the connector 32R will further rotate the power arm 23R and crank arm 21R to the position illustrated in FIG. 6. In this position, the power arm 23R is located at substantially bottom dead center, i.e. 180°, while the associated crank arm 21R has moved relatively forwardly of the power arm 23R to approximately 195° past top dead center or 15° forwardly of the power arm 23R. During this movement, the cam element 25R has relatively decelerated the power arm 23R behind the crank arm 21R.

It will be importantly noted that when the power arm 23R is located in its bottom dead center position as illustrated in FIG. 6, the other power arm 23L is located 30° past dead top center, and its associated crank arm 21L is located 15° past top dead center, so that when downward movement is applied to the pedal arm 30L, effective turning force is applied to the power arm 23L and thence to the crank arm 21L. It will be understood that a dead top center position of the power arm 23L and crank arm 21L is avoided when the power arm 23R is located in its bottom dead center position.

Now, the pedal arm 30L is depressed from its substantially upright position and rotative force is applied to the power arm 23L through the connector 32L, and thence to the crank arm 21L through the cam element 25L. When the power arm 23L and crank arm 21L are moved from the positions shown in FIG. 6 to the positions shown in FIG. 7, they are aligned at approximately 105° past dead top center. The cam element 25L has relatively decelerated the movement of the pedal arm 23L. Conversely, the cam element 25R has now relatively accelerated the movement of the power arm 23R to bring it into alignment with its associated crank arm 21R.

Upon still further downward movement of the pedal arm 30L, the cam element 25R will accelerate the power arm 23R ahead of the crank arm 21R until the power arm 23R and crank arm 21R are located again in the positions illustrated in FIG. 4, thereby providing a complete cycle of operation.

It will be understood that the reduced cam shaft end 33R is adjustably attached, as by a set screw, to the connector 32R so as to vary the relative angular relation of the cam element 25R between the crank arm 21R and power arm 23R, whereby to select the position during the crank arm cycle at which the maximum angular distance occurs between the crank arm 21R and power arm 23R. The cam element 25R can be selectively locked in the adjusted position relative to the connector 32R by a conventional set screw 35R.

Figure 8:
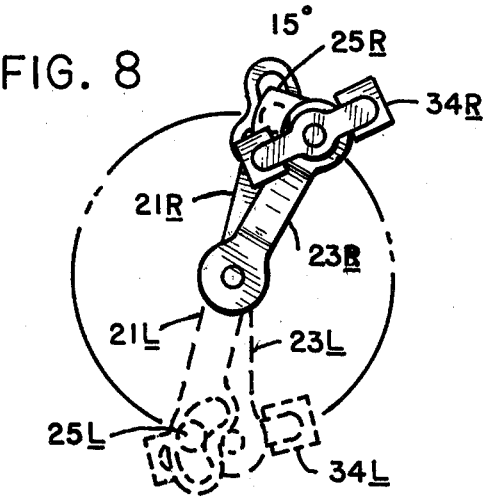
FIG. 8 is a diagram illustrating the drive assembly of FIGS. 1–7 with rotary pedal action.

It will also be understood that the drive assembly described above in FIGS. 1–7 can be utilized to accomplish the same advantages for rotary pedal action as it does for reciprocating or oscillating pedal action. This is accomplished basically by shifting the component parts of the drive assembly around until the top dead center position of the crank arm is located substantially at the top of the cycle, and transferring the pedals 34R and 34L from the connectors 32R and 32L to a connection directly with the cam shafts 26R and 26L of the cam elements 25R and 25L, as is illustrated diagrammatically in FIG. 8. It will be understood that the rate of rotary pedal action obtains the same advantages during top dead center and the early degrees of crank arm travel as does the reciprocating or oscillating acting pedal. In fact, the rotary pedal rate of travel for the 360° cycle is relatively the same as accomplished by the reciprocating or oscillating pedal travel. It is to be understood that foot pressure as normally applied to the pedal 34R while riding the bicycle will serve to hold the pedal 34R and the cam element 25R in the same way as does the connector 32R in the embodiment of FIGS. 4–7.

Figure 9:
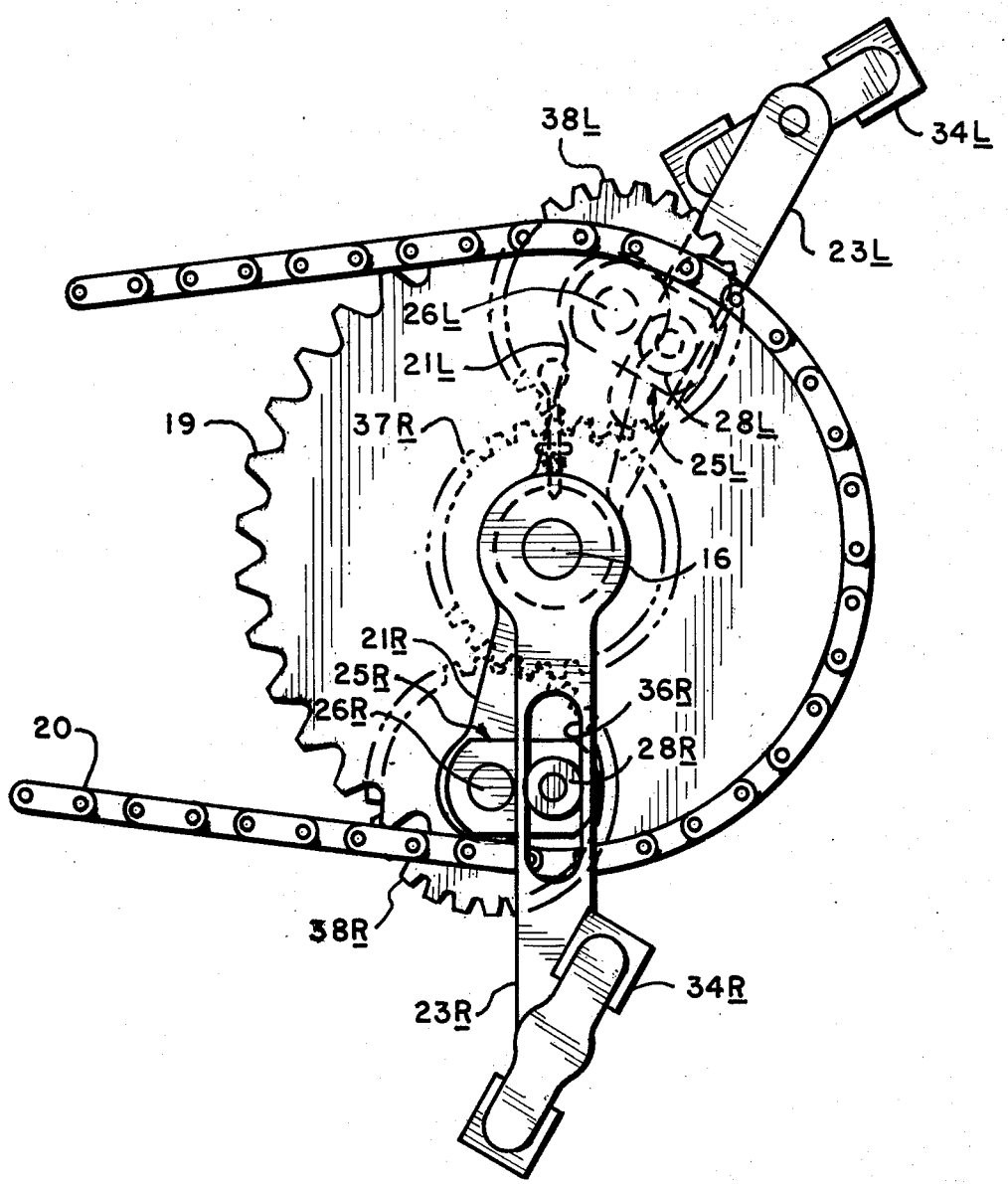
FIG. 9 is a fragmentary, side elevational view of another embodiment of the drive assembly.
Figures 10, 11:
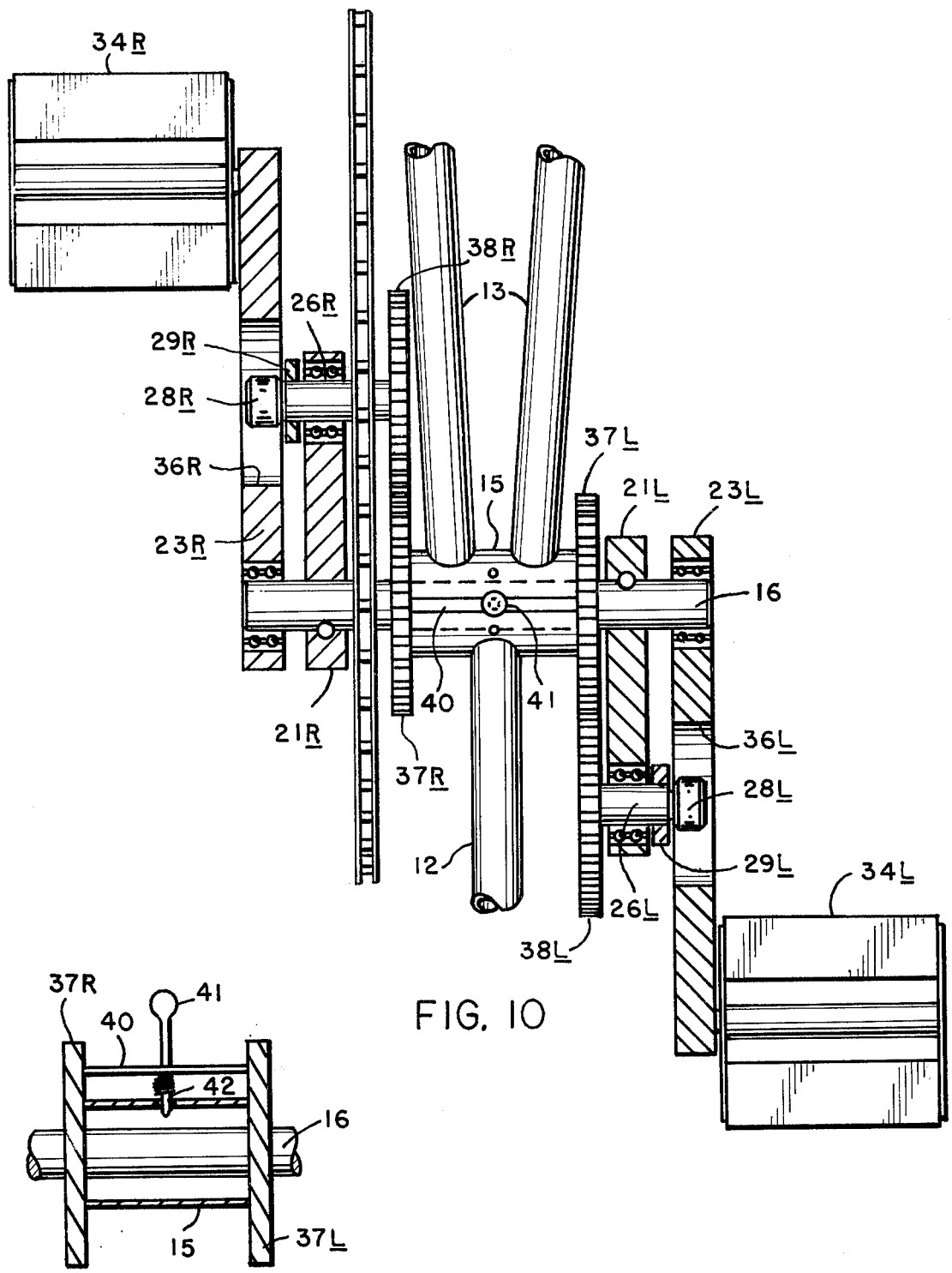
FIG. 10 is a top plan view of the assembly shown in FIG. 8.
FIG. 11 is a fragmentary view illustrating the adjustable mounting of the sun gear in the embodiment of FIG. 10.

FIGS. 9–11 illustrate another embodiment of the drive assembly adapted particularly for a rotary pedal action. In this embodiment, the control means includes a slot formed in the pedal arm 23R to provide the cam surface 36R. The cam shaft 26R of the cam element 25R is rotatively mounted in the crank arm 21R. The cam follower 28R is received in the slot and engages the cam surface 36R.

The pedal means includes a pedal 34R connected to the outer end of the power arm 23. A first gear 37R, constituting a sun gear, is mounted on the drive axis DA of the crank shaft 16 and meshes with a second gear 38R, constituting a planet gear, that is connected to the reduced cam end 33R of the cam shaft 26R and rotates about the first gear 37R. The second gear 38R causes relative rotation of the cam element 25R and the crank arm 21R during rotation of the crank arm 21R and power arm 23R for selectively moving the power arm 23R ahead of and behind the crank arm 21R.

In this embodiment of the drive assembly, as downward foot pressure is applied to the pedal 34L, the power arm 23L and the associated crank arm 21L are rotated. At the same time, the crank arm 21L rotates the crank shaft 16, and the second gear 38L rotates about the center first gear 37L with which it meshes. As the second gear 38L rotates on its axis, the cam element 25L is rotated so that the cam follower 28L moves on the cam surface 36L to reduce the angular distance between the crank arm 21L and power arm 23L. Upon continued rotation, the power arm 23L will move from a position ahead of the crank arm 21L to a position behind the crank arm 21L. The same basic advantages are obtained during top dead center and the early degrees of crank arm travel as those obtained by the reciprocating or oscillating pedal drive assembly described previously.

Upon continued rotation, the power arm 23L will move from a position behind the associated crank arm 21L to a position ahead of the crank arm 21L to complete the cycle.

As shown in FIG. 9, the maximum angular distance between the power arm 23L and the associated crank arm 21L occurs when the crank arm 21L is located at 15° past dead top center and the power arm 23L is located 30° past dead top center. Of course, in this position the power arm 23L is located ahead of the crank arm 21L. The positions of the power arm 23R and associated crank arm 21R in FIG. 9 illustrate the corresponding maximum angular distance between such arms at the other position of the crank arm cycle. In this position, the power arm is located at dead bottom center or 180°, while the crank arm 21R is located at 195°.

It will be understood that the angular position of the cam element 25R between the crank arm 21R and 23R can be adjusted so as to select the position during the crank arm cycle at which the maximum angular distance occurs between the crank arm 21R and power arm 23R. For example, the first gears 37R and 37L can be rotatively mounted on the crank shaft 16 and rigidly interconnected by a bracket 40. A spring-mounted lock plunger 41, carried by the bracket 40, is adapted to interfit any one of a series of compatible lock recesses 42. By rotating the first gears 37R and 37L slightly and locking them in place with the lock plunger 41, the meshing second gears 38R and 38L are selectively rotated, and hence the relative angular position of the cam elements 25R and 25L between their associated crank arms 21R and 21L and power arms 23R and 23L has been changed. As stated previously, this adjustment causes a change in the position of the crank arm cycle at which the maximum angular distance between the crank arms and power arms occurs.

Of course, in each embodiment of the drive assembly, the spacing between the cam shaft 26R and its associated cam follower 28R determines the maximum angular distance between the associated crank arm 21R and power arm 23R.

I claim as my invention:

1. A drive assembly for a physically propelled vehicle comprising:
   a. a drive member rotatively mounted on a drive axis,
   b. a crank arm operatively connected to the drive member on the same drive axis for rotating the drive member,
   c. a power arm rotatively mounted on the same drive axis for relative angular movement between the power arm and crank arm,
   d. a pedal means operatively connected to the power arm for rotating the power arm, and
   e. control means interconnecting the power arm and crank arm for rotating the crank arm and drive member, and for accelerating the power arm ahead of the crank arm during one portion of the crank arm cycle and decelerating the power arm behind the crank arm during another portion of the crank arm cycle, and
   f. the control means including:
      1. a cam surface provided on one of the arms, and
      2. a cam follower carried by the other of the arms and engaging the cam surface.

2. A drive assembly for a physically propelled vehicle comprising:
   a. a drive member rotatively mounted on a drive axis,
   b. a crank arm operatively connected to the drive member for rotating the drive member,
   c. a power arm rotatively mounted for relative angular movement between the power arm and crank arm,
   d. a pedal means operatively connected to the power arm for rotating the power arm,
   e. control means interconnecting the power arm and crank arm for rotating the crank arm and drive member, and for accelerating the power arm ahead of the crank arm during one portion of the crank arm cycle and decelerating the power arm behind the crank arm during another portion of the crank arm cycle, and
   f. the control means including:
      1. a cam slot in one of the arms, and
      2. a cam element having a shaft rotatively mounted in the other of the arms, a cam follower spaced from the shaft and received in the cam slot, and a link between the shaft and cam follower.

3. A drive assembly for a physically propelled vehicle comprising:
   a. a drive member rotatively mounted on a drive axis,
   b. a crank arm operatively connected to the drive member for rotating the drive member,
   c. a power arm rotatively mounted on the drive axis for relative angular movement between the power arm and crank arm,
   d. a pedal means operatively connected to the power arm for rotating the power arm,
   e. control means interconnecting the power arm and crank arm for rotating the crank arm and drive member, and for accelerating the power arm ahead of the crank arm during one portion of the crank arm cycle and decelerating the power arm behind the crank arm during another portion of the crank arm cycle, the control means including:
      1. a cam slot in the crank arm, and
      2. a cam element having a shaft rotatively mounted in the power arm, a cam follower spaced from the shaft and received in the cam slot, and a link between the cam shaft and cam follower,
   f. the pedal means including a reciprocating connector pivotally connected to the power arm for rotating the power arm, the connector being attached to the cam shaft of the cam element to cause relative rotation of the cam element and power arm during rotation of the crank arm and power arm for selectively moving the power arm ahead of and behind the crank arm as the cam follower rides in the cam slot, the angular position of the cam element between the crank arm and power arm determining the position during the crank arm cycle at which the maximum angular distance occurs between the crank arm and power arm.

4. A drive assembly for a physically propelled vehicle comprising:
   a. a drive member rotatively mounted on a drive axis,
   b. a crank arm operatively connected to the drive member for rotating the drive member,
   c. a power arm rotatively mounted for relative angular movement between the power arm and crank arm,
   d. a pedal means operatively connected to the power arm for rotating the power arm,
   e. control means interconnecting the power arm and crank arm for rotating the crank arm and drive member, and for accelerating the power arm ahead of the crank arm during one portion of the crank arm cycle and decelerating the power arm behind the crank arm during another portion of the crank arm cycle, and
   f. the control means including:
      1. a cam surface provided on one of the arms, and
      2. a cam element having a shaft rotatively mounted on the other of the arms and having a cam follower spaced from the shaft and engaging the cam surface.

5. A drive assembly as defined in claim 4, in which:
   g. means is fixed to the cam element to cause relative rotation of the cam element and the arm to which the shaft is rotatively mounted to regulate movement of the cam follower on the cam surface during rotation of the cam arm and power arm for selectively moving the power arm ahead of and behind the crank arm.

6. A drive assembly as defined in claim 4, in which:
   g. the pedal means includes means fixed to the rotatively mounted shaft of the cam element to cause relative rotation of the cam element and arm to which the shaft is rotatively mounted to regulate movement of the cam follower on the cam surface during rotation of the crank arm and power arm for selectively moving the power arm ahead of and behind the crank arm.

7. A drive assembly as defined in claim 4, in which:
   g. the cam surface is provided on the crank arm, and
   h. the cam shaft is rotatively mounted in the power arm.

8. A drive assembly as defined in claim 7, in which:
   i. the pedal means includes a reciprocating connector pivotally connected to the power arm for rotating the power arm, the connector being attached to the cam shaft of the cam element to cause relative rotation of the cam element and the power arm during rotation of the crank arm and the power arm for selectively moving the power arm ahead of and behind the crank arm, the angular position of the cam element between the crank arm and power arm determining the position during the crank arm cycle at which the maximum angular distance occurs between the crank arm and power arm.

9. A drive assembly as defined in claim 8, in which:
j. the cam shaft of the cam element is adjustably attached to the connector to vary the relative angular relation of the cam element between the crank arm and power arm so as to select the position during the crank arm cycle at which the maximum angular distance occurs between the crank arm and power arm.

10. A drive assembly as defined in claim 4, in which:
g. the cam surface is provided on the power arm, and
h. the cam shaft is rotatively mounted in the crank arm.

11. A drive assembly as defined in claim 10, in which:
i. the pedal means includes:
 1. a first gear mounted on the drive axis of the crank arm, and
 2. a second gear meshing with and rotatable about the first gear, the second gear being attached to the cam shaft to cause relative rotation of the cam element and crank arm during rotating of the crank arm and power arm for selectively moving the power arm ahead of and behind the crank arm.

12. A drive assembly as defined in claim 11, in which:
j. the first gear is adjustably mounted to vary the relative angular position of the cam element between the crank arm and power arm so as to select the position during the crank arm cycle at which the maximum angular distance occurs between the crank arm and power arm.

13. A drive assembly for physically propelled vehicle comprising:
a. a drive member rotatively mounted on a drive axis,
b. a crank arm operatively connected to the drive member for rotating the drive member,
c. a power arm rotatively mounted on the drive axis for relative angular movement between the power arm and crank arm,
d. a pedal means operatively connected to the power arm for rotating the power arm,
e. control means interconnecting the power arm and crank arm for rotating the crank arm and drive member, the control means including:
 1. a cam slot in the power arm, and
 2. a cam element having a shaft rotatively mounted in the crank arm, a cam follower spaced from the shaft and received in the cam slot, and a link between the shaft and cam follower,
f. the pedal means includes:
 1. a sun gear fixedly mounted on the drive axis, and a planet gear meshing with and rotatable about the sun gear and connected to the cam shaft of the cam element to cause relative rotation of the cam element and crank arm during rotation of the crank arm and power arm for selectively moving the power arm ahead of and behind the crank arm as the cam follower rides on the cam surface.

* * * * *